United States Patent

Simon et al.

[11] Patent Number: 5,871,644
[45] Date of Patent: Feb. 16, 1999

[54] FILTER FOR BREWED BEVERAGES, ESPECIALLY COFFEE FILTER, AND PROCESS FOR PRODUCING IT

[75] Inventors: Werner Simon, Minden; Lutz Wittenschlaeger, Hille; Fred Bergmann, Barenburg, all of Germany

[73] Assignee: Melitta Haushaltsprodukte GmbH & Co. KG, Minden, Germany

[21] Appl. No.: 750,350

[22] PCT Filed: Apr. 9, 1996

[86] PCT No.: PCT/EP96/01515

§ 371 Date: Mar. 11, 1997

§ 102(e) Date: Mar. 11, 1997

[87] PCT Pub. No.: WO96/32043

PCT Pub. Date: Oct. 17, 1996

[30] Foreign Application Priority Data

Apr. 10, 1995 [DE] Germany .................. 195 13 600.4

[51] Int. Cl.[6] ................................................. B01D 39/08
[52] U.S. Cl. .................... 210/483; 156/62.8; 156/148; 55/487; 428/218
[58] Field of Search .................... 210/473, 474, 210/477, 482, 483, 503, 506, 508, 510.1; 55/486, 487; 428/131, 134, 136, 170, 213, 215, 218; 156/62.6, 148

[56] References Cited

U.S. PATENT DOCUMENTS

| | | | |
|---|---|---|---|
| 3,360,132 | 12/1967 | Harvith | 210/477 |
| 3,719,282 | 3/1973 | Schwartz | 210/477 |
| 4,279,630 | 7/1981 | Nakamura et al. | 55/316 |
| 5,143,767 | 9/1992 | Matsuura et al. | 55/521 |

FOREIGN PATENT DOCUMENTS

| | | |
|---|---|---|
| 6939904 | 3/1970 | Germany . |
| 2802240 | 7/1979 | Germany . |
| 3434687 | 4/1986 | Germany . |
| 3642898 | 7/1988 | Germany . |
| 9015872 U | 6/1991 | Germany . |
| 4135660 | 5/1992 | Germany . |
| 9318405 U | 3/1994 | Germany . |

*Primary Examiner*—W. L. Walker
*Attorney, Agent, or Firm*—Spencer & Frank

[57] ABSTRACT

The invention relates to a filter for brewed beverages, especially a coffee filter, and a process for producing such a filter, in which a fibrous material has pores with an average pore width (d) of at least about 0.1 mm measured at a fiber density of about 50% of the original fiber density of the material. The average pore width (d) is preferably in a range from 0.1 mm to 0.7 mm approximately and more preferably in a range from 0.1 mm to 0.4 mm approximately. The material is preferably paper. The pores are also preferably made by piercing with needles or by subjecting the fibrous material to water jets, providing an irregular pore edge.

20 Claims, 8 Drawing Sheets

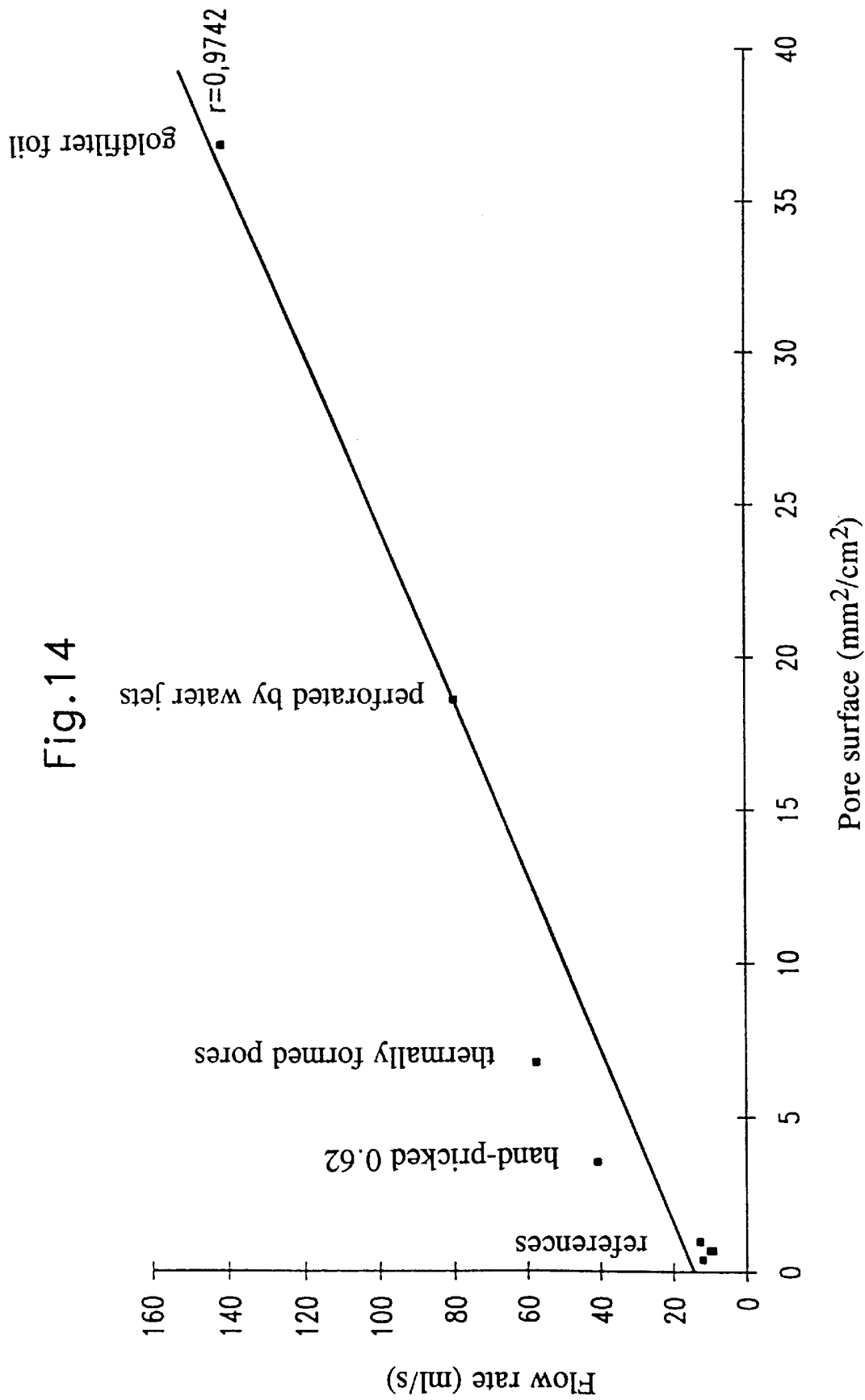

FILTER FOR BREWED BEVERAGES, ESPECIALLY COFFEE FILTER, AND PROCESS FOR PRODUCING IT

BACKGROUND OF THE INVENTION

1. Field of the Invention

The invention relates to a filter for brewed beverages, especially a coffee filter, having pores and a process for producing such a filter.

2. Description of the Related Art

Coffee filters made of paper are known, such as the filter bags "Filtertüten®" of the applicant. These coffee filters are made of crepe paper in order to increase their surface and have pores which are not or hardly detectable with the naked eye. The German Utility Model 69 39 904 describes coffee filters with a pore size of between 5 $\mu$m and 20 $\mu$m which allow aromatic colloidal particles to pass through the filter.

Documents DE 28 02 240 (laid open), DE 34 34 687 (laid open), DE 36 42 898 (laid open) and DE 41 35 660 (laid open) relate to coffee filters of a sheet-type material made from plastics or metal having sharp-edged holes or pores.

It is the object underlying the present invention to provide a filter for brewed beverages, especially a coffee filter, which is easy to produce and which improves the filtrate, such as coffee, as well as a process for the production of such a filter.

SUMMARY OF THE INVENTION

This object is achieved by means of a filter and a process for producing a filter according to the patent claims.

The idea underlying the invention is to provide a filter for brewed beverages, especially a coffee filter, made from blotting paper-like, web-like or fibrous material having pores with an average pore width of at least about 0.1 mm measured at a fiber density of about 50% of the original or average fiber density of the material; the average maximal pore width is preferably from about 0.6 to about 0.7 mm and more preferably from about 0.3 mm to about 0.4 mm. A range of an average pore width of from 0.15 to 0.25 mm is especially preferred.

The terms original or average fiber density of the filter material relate to the fiber density of the material prior to the formation of the mentioned pores and the average fiber density of the material throughout the entire filter surface, respectively.

A filter according to the present invention is produced from suitable papers and non-woven fabrics made from natural and/or synthetic cellulose-based fibers and/or from fibers of synthetic polymers as well as from mixtures of the mentioned fibers. The weight per unit area of preferred materials is about 10 to about 100 g/m$^2$. The fibrous material is preferably filter paper as it has already been used for the filter bags "Filtertüten®". After the formation of pores in this material, which is preferably carried out by means of needles or water jets, the margins or edges of the pores are not sharp but, due to the fibrous material, irregular or "frayed" or porous.

Pores of such a size are particularly easy to produce and in particular improve the flavor of the coffee filtrate. Despite their relatively large average pore width, these pores surprisingly also filter powder particles such as coffee particles which are of a markedly smaller size, down to 10 $\mu$m. This effect is probably due to the relatively large capillary forces acting at the dull edges of the pores.

The formation of pores with average pore widths of larger than about 0.1 mm increases the filtration performance or flow rate of the filter. This way, clogging or overflowing of the filter, in particular in coffee machines, is avoided. In addition, due to the larger pores in the filter considerably more colloidal aromatic particles can pass through the filter and alkaloids, such as caffeine, which are easily absorbed by conventional paper filters during the brewing of coffee, are not held back as they are in conventional paper filters. This way, the flavor of the filtrate, in particular during the brewing of coffee, is enhanced.

When fibrous material with such large pores is used, the possible swelling of the filter material does not impair the flow properties of the filter to such a marked extent as it does in conventional filter papers.

The increase of the pore width compared to conventional paper coffee filters offers the further advantage that the filter according to the present invention can be used for a number of brewed beverages, especially for other less common types of coffee such as espresso, malt coffee, grain coffee and caramel coffee. Furthermore, the filter material does no longer need to be creped which results in a reduction of costs.

Due to the average pore width of up to 0.6 mm or also 0.7 mm in the fibrous material the formation of grounds in the filtrate and the noticeable cloudiness of the filtrate are prevented.

Furthermore, by means of a preferred average pore width range of about 0.1 mm to about 0.4 mm and more preferred to about 0.3 mm lipids contained in the coffee are held back so that they cannot proceed to the filtrate and affect the cholesterol levels of the consumer. It was found that especially the lipids contained in coffee can permanently raise the cholesterol level in the consumers' blood and have damaging effects on their health (cf. "Identity of the cholesterol-raising factor from boiled coffee and its effects on liver function enzymes" in Journal of Lipid Research, Vol. 35, 1994).

The free pore surface preferably covers up to 20% of the entire filter surface. It was found that such a percentage of free pore surface allows a satisfactory filter effect due to the porosity already present in the filter paper. If the percentage of free pore surface is higher, there is an increased formation of grounds in the filtrate. At an average pore width of about 0.3 mm in a filter according to the present invention and a free pore surface of 20%, there is still no increased perviousness for the health-impairing and undesired coffee lipids.

Furthermore, it was found that the processability and tear resistance of a paper is not affected by the given range of the average pore widths so that the filter according to the present invention remains stable, filter parts that are joined by embossing are not weakened and other packaging and processing problems are avoided.

Preferably, the average pore width and/or surface density of the pores increases towards that area of the filter which in the practical application forms the bottom part. This way, the flow in the lower part of the filter is increased, i.e. in the area where there are larger amounts of ground coffee compared to the other areas. The permeability of the filter according to the present invention is preferably adjusted such that the passage of filtrate through the filter remains approximately constant throughout the entire level of the liquid in the filter. This way, differences in permeability due to different amounts of beverage particles and different pressures are compensated and the brewed beverage is used better and more uniformly.

In a further preferred embodiment of the filter according to the present invention, the pores are formed and located such that they form a specific perforation line the tearing of which allows a purposeful reduction of the size of the filter. In the case of a coffee filter, for example, the filter intended for a filter holder of the size 1×4 can be reduced in size to fit a filter holder of the size 1×2.

In addition, or alternatively, the pores may be formed and positioned such that they form certain folding lines in the filter which support an opening of the filter at specific locations such as in the proximity of the embossing.

BRIEF DESCRIPTION OF THE DRAWINGS

The objects, advantages and features of the present invention are described in more detail in the following by means of examples and with reference to the drawings.

FIG. 14 shows the flow rate as a function of the pore surface.

DESCRIPTION OF THE PREFERRED EMBODIMENTS

Figure 1:
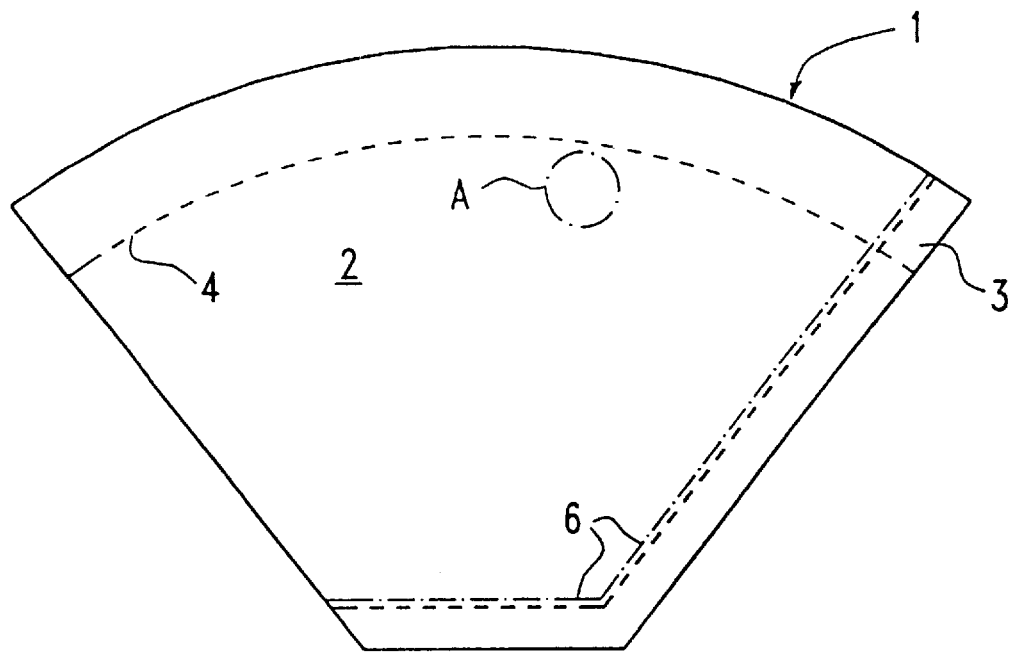
FIG. 1 shows a schematic view of a side projection of an embodiment of the filter according to the present invention.

The filter 1 of the present invention according to FIG. 1 is preferably formed by two layers of filter material folded on top of each other. These layers are joined, for instance by embossing, along the bottom edge and one side edge 3. FIG. 1 shows the topmost layer 2 of the filter material.

Figure 2:
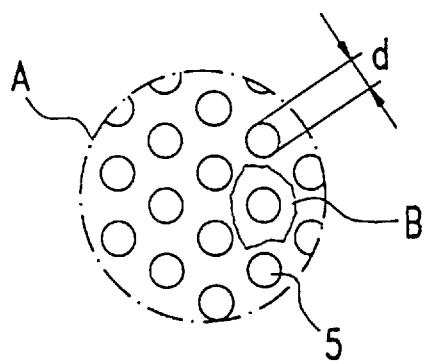
FIG. 2 shows a magnified detail A of FIG. 1 with a schematic view of preferred pores.
Figure 3:
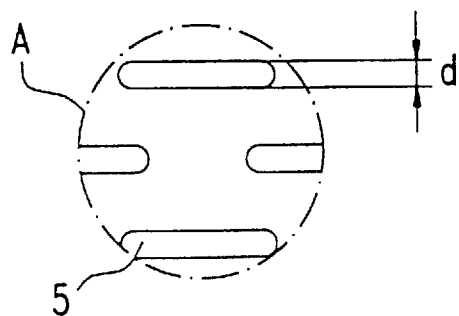
FIG. 3 shows a magnified detail A of FIG. 1 with a further embodiment of preferred pores.

The filter material has pores 5, as e.g. shown in FIGS. 2 and 3. These pores 5 are preferably formed and located along a line 4 such that they form a perforation line through both layers of the filter. The top portion of the filter can easily be removed along this perforation line 4 so that the filter can be used for a smaller filter holder as well. Outside of the edge area 3, however, in its vicinity, the pores preferably furthermore form folding lines 6 so that the filter easily unfolds and opens up in a known filter holder, for example in order to facilitate filling in the coffee powder.

From FIGS. 2 and 3 it can be seen that the pores 5 in the filter of the present invention can have any shape as long as they have an effective average pore width d of at least about 0.1 mm and preferably up to about 0.7 mm, measured at a fiber density of about 50% of the original or average fiber density of the material.

The essentially circular pores 5 shown in FIG. 2 are preferred since they can be formed by means of a relatively simple processing of the filter material. Preferably, the pores are formed in the fibrous material by means of boring, slotting, heat and voltage discharges. Also preferred is rolling the fibrous material with a needle roller or processing with water jets. Using needles in order to produce the filter of the present invention is especially easy to carry out and has a considerable advantage with respect to costs and structure compared to other processes, such as for example forming pores by means of lasers, milling or punching; this advantage is described in more detail in the following. The pores formed by means of rolling the fibrous material with a needle roller are slightly pear-shaped when viewed from above which is caused by the horizontal-swing movement of the needles attached to the roller vis-à-vis the material web which is guided past.

Figure 4:
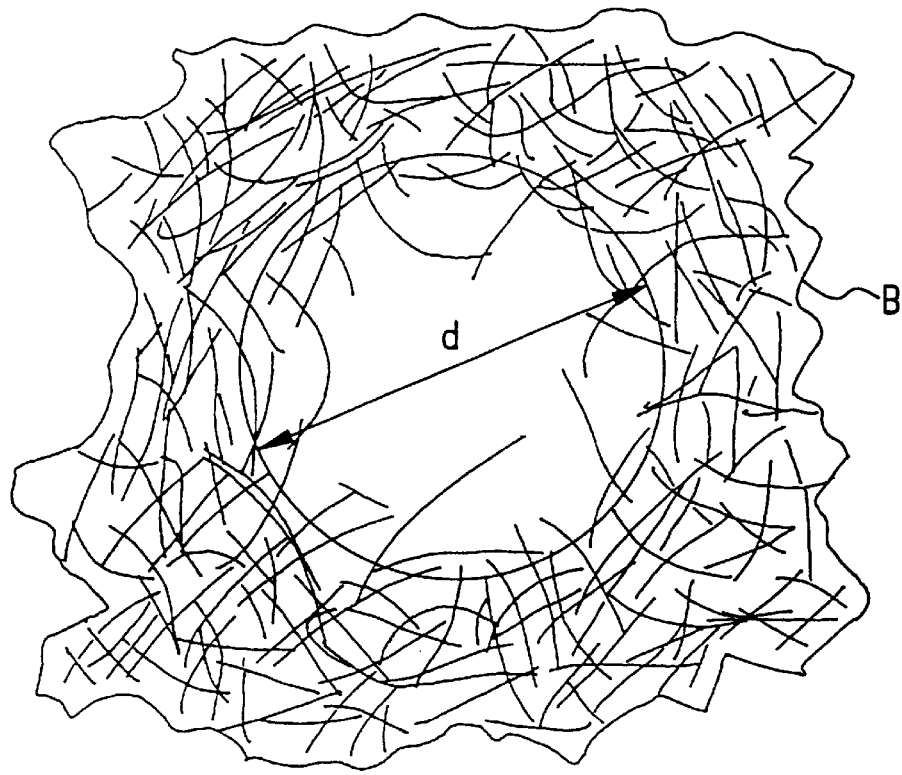
FIG. 4 shows a schematic magnification of detail B of FIG. 2.

FIG. 4 shows a magnification of detail B of FIG. 2. This should illustrate in particular that a pore formed in the fibrous material according to the present invention does not have a sharp edge, but a dull or porous one. Such a structure is caused for example by the rolling of the fibrous material with a needle roller which first and foremost displaces partly elastic material and does not remove it. Due to the fibrous character of the material a pore with an average pore width d is formed. This structure causes an increase in the capillary forces of the liquid to be filtered in particular at the edges of the pores thereby increasing the filter effect of the pores which are formed easily.

Figure 5:
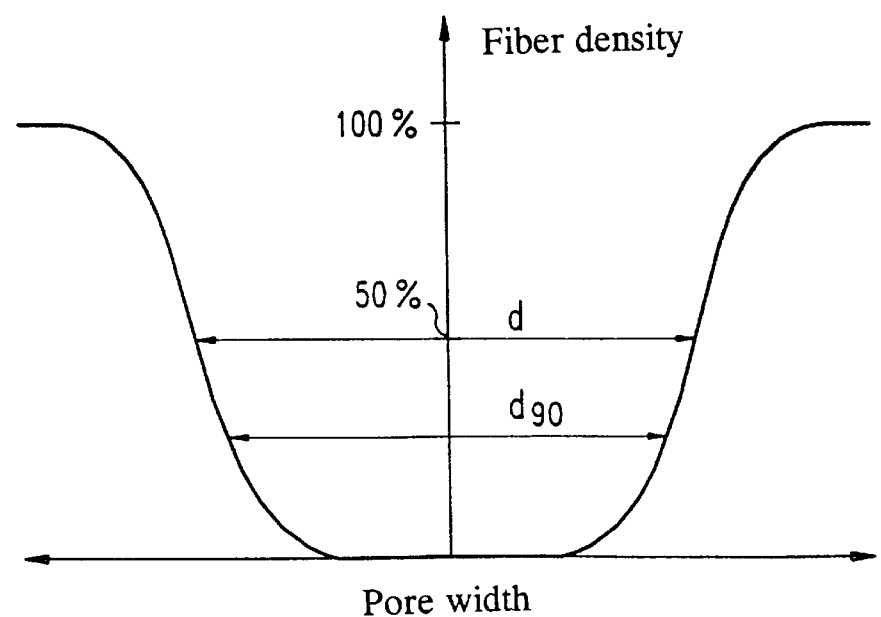
FIG. 5 shows a schematic view of the distribution of the fibrous material in the area of a pore according to FIG. 4.

FIG. 5 shows the statistical distribution of the fibrous material in the vicinity of a pore, such as e.g. a pore according to FIG. 4. The horizontal axis shows the pore width and the vertical axis shows the fiber density in the vicinity of the pore. In the close vicinity of the pore, the fiber density of the material decreases towards the center of the pore. The increase of the statistical distribution depends on the material and on the manner in which the pore was formed. By definition, the fiber density at an average pore width d is 50% of the fiber density of the original material, i.e. of the material prior to the formation of the pores or the average fiber density of the material ("half-value fiber density").

A preferred material has a fiber density of about 0% to about 40% at a pore width $d_{90}$ which corresponds to 90% of the average pore width d. A more preferred material has a fiber density of about 0% to 20% and more preferably of about 5% to 15% of the original or average fiber density at a pore width dgo.

The fibrous nature of the material in the area of the pore has to be coordinated with the chemical and physical consistency of the brewed beverage.

Figure 6:
FIG. 6 shows a scanning electron micrograph of a hundredfold magnification of a pore formed in a filter according to the present invention by means of a needle roller.
Figure 7:
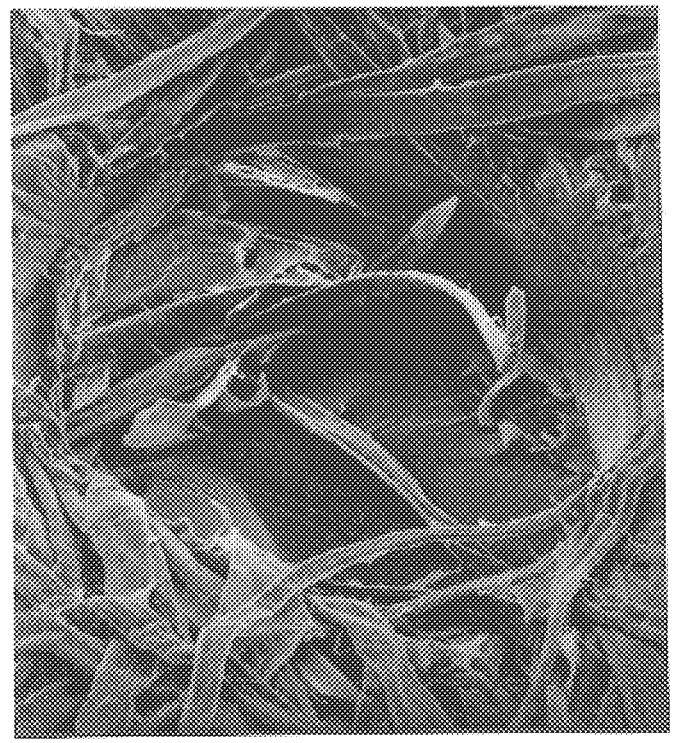
FIG. 7 shows a scanning electron micrograph of FIG. 6 with a 200-fold magnification.

The scanning electron micrographs of FIGS. 6 and 7 clearly show the dull edge of a pore in a filter according to the present invention. Some of the fibers of the fibrous material have been displaced towards the edge by the needle process and some have been torn or severed.

Figure 8:
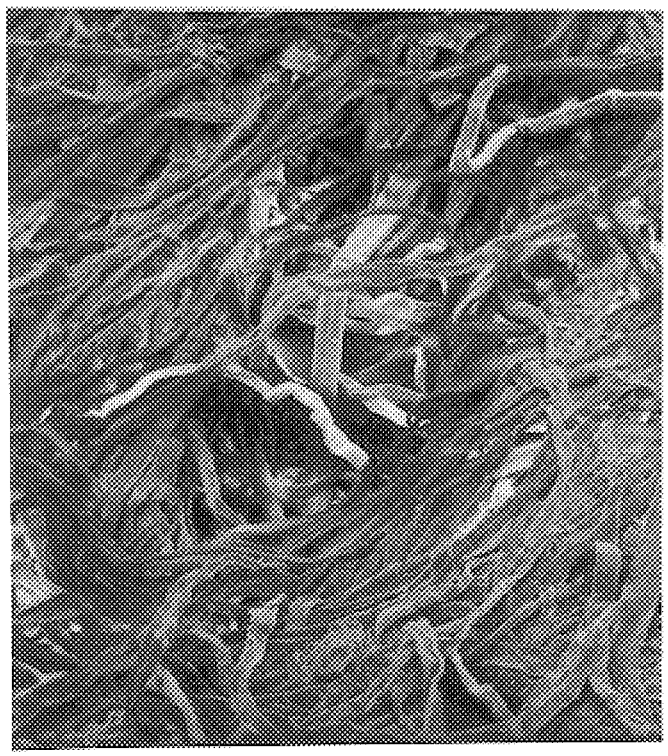
FIG. 8 shows a scanning electron micrograph of a 102-fold magnification a filter according to the present invention with a pore formed by means of a water jet.
Figure 9:
FIG. 9 shows a scanning electron micrograph of a 106-fold magnification of a filter according to the present invention with a further pore formed by means of a water jet.

FIGS. 8 and 9 show pores formed by means of a water jet. In the case of these pores, the fiber density changes only very slowly towards the center of the pore. Macroscopically, a filter treated in this manner has a rough structure with microscopically small free passage openings.

Figure 10:
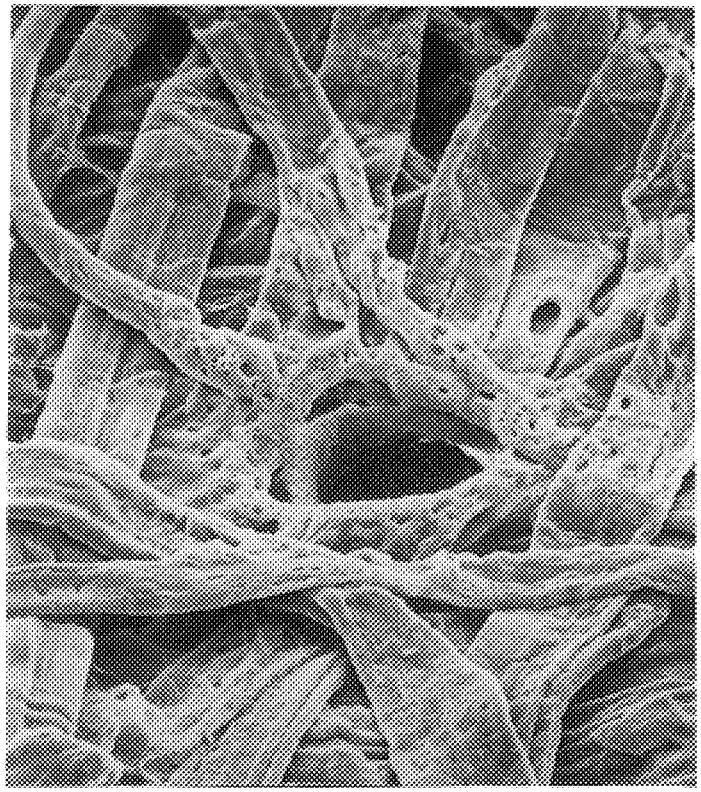
FIG. 10 shows a scanning electron micrograph of a 400-fold magnification of a filter according to the present invention with a pore formed by means of a voltage discharge.
Figure 11:
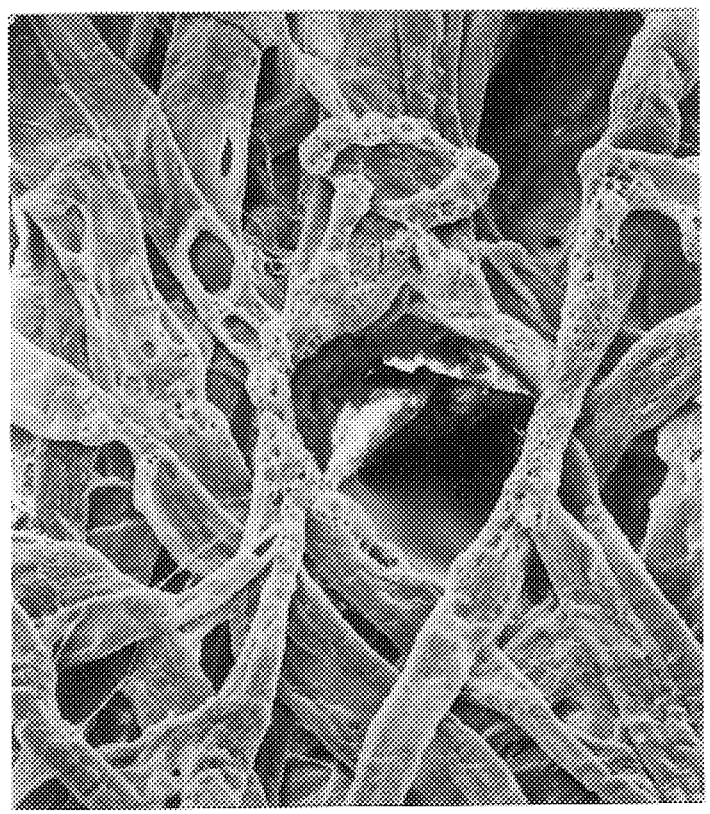
FIG. 11 shows a scanning electron micrograph of a further pore according to FIG. 8 formed by means of a voltage discharge.

FIGS. 10 and 11 show that the formation of the pores by means of voltage discharge apparently welds together the fibers at the edges of the pores and causes the formation of a porous structure at the edges.

Figure 12:
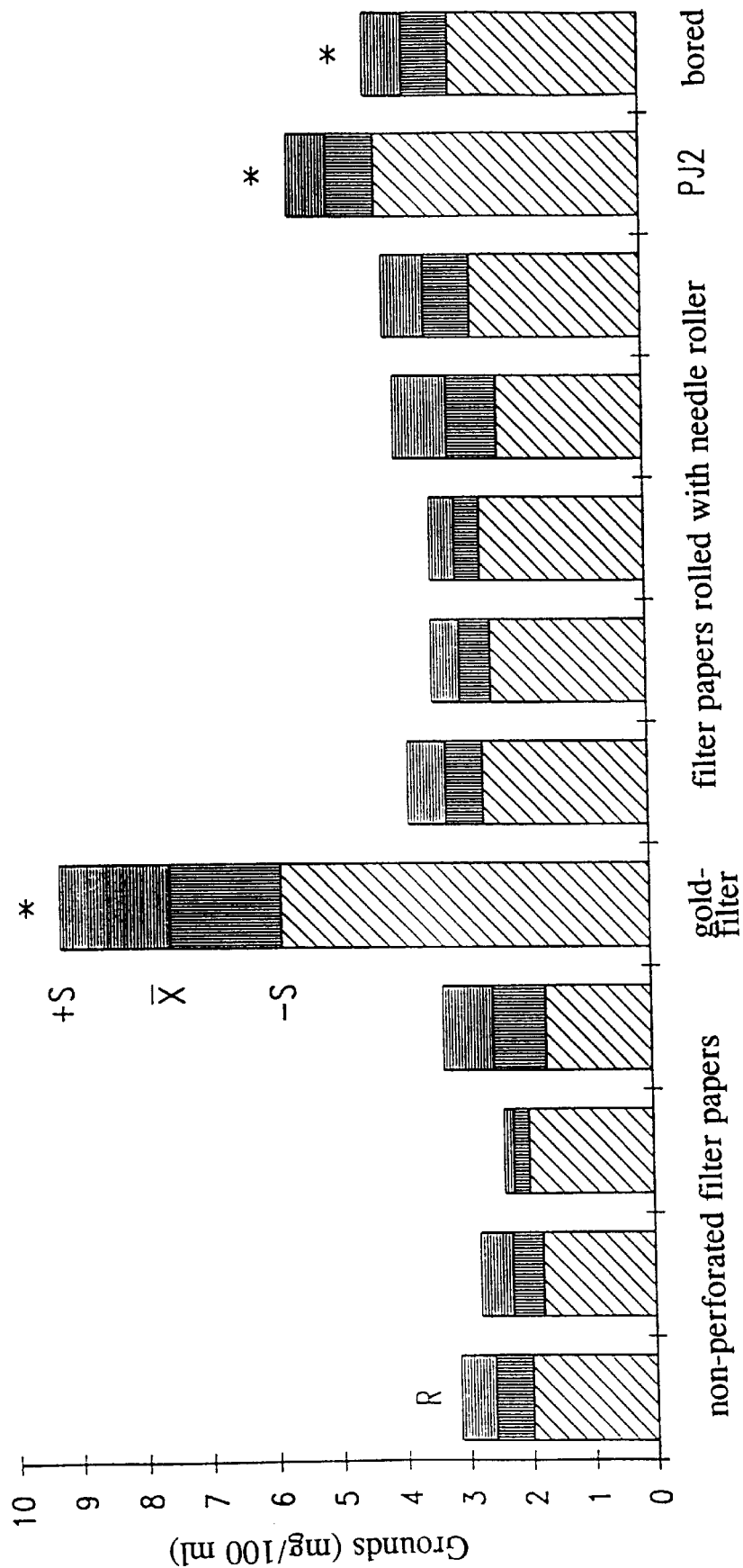
FIG. 12 shows a statistical diagram showing the amount of coffee grounds resulting from filtrates filtered with different filters.

FIG. 12 shows a statistical diagram for determining the amount of grounds. The statistically significant difference in comparison with reference R (LORD test, double-sided, 95% probability) was marked with an "*". The average values × with the standard deviations S are shown. The first four samples are conventional coffee filter reference papers without holes. Sample number 5 is a so-called "goldfilter", consisting of a slotted metal foil with pores measuring 0.18 mm×2 mm. Samples 6 to 10 are filters according to the invention which have been rolled with a needle roller and which have an average pore width of about 0.25 mm. Sample number 11 is a sample of a filter according to the present invention marked with "PJ2" whose pores were formed by means of a water jet process with an average pore width of 0.2 to 0.3 mm. The last sample is a bored sample of a conventional filter paper with pores having a diameter of 0.6 mm. All the given values were taken from machine brewing.

It is shown that the use of a fibrous material clearly decreases the clouding of the coffee filtrate caused by the grounds compared to a filter with pores having sharp edges.

Figure 13:
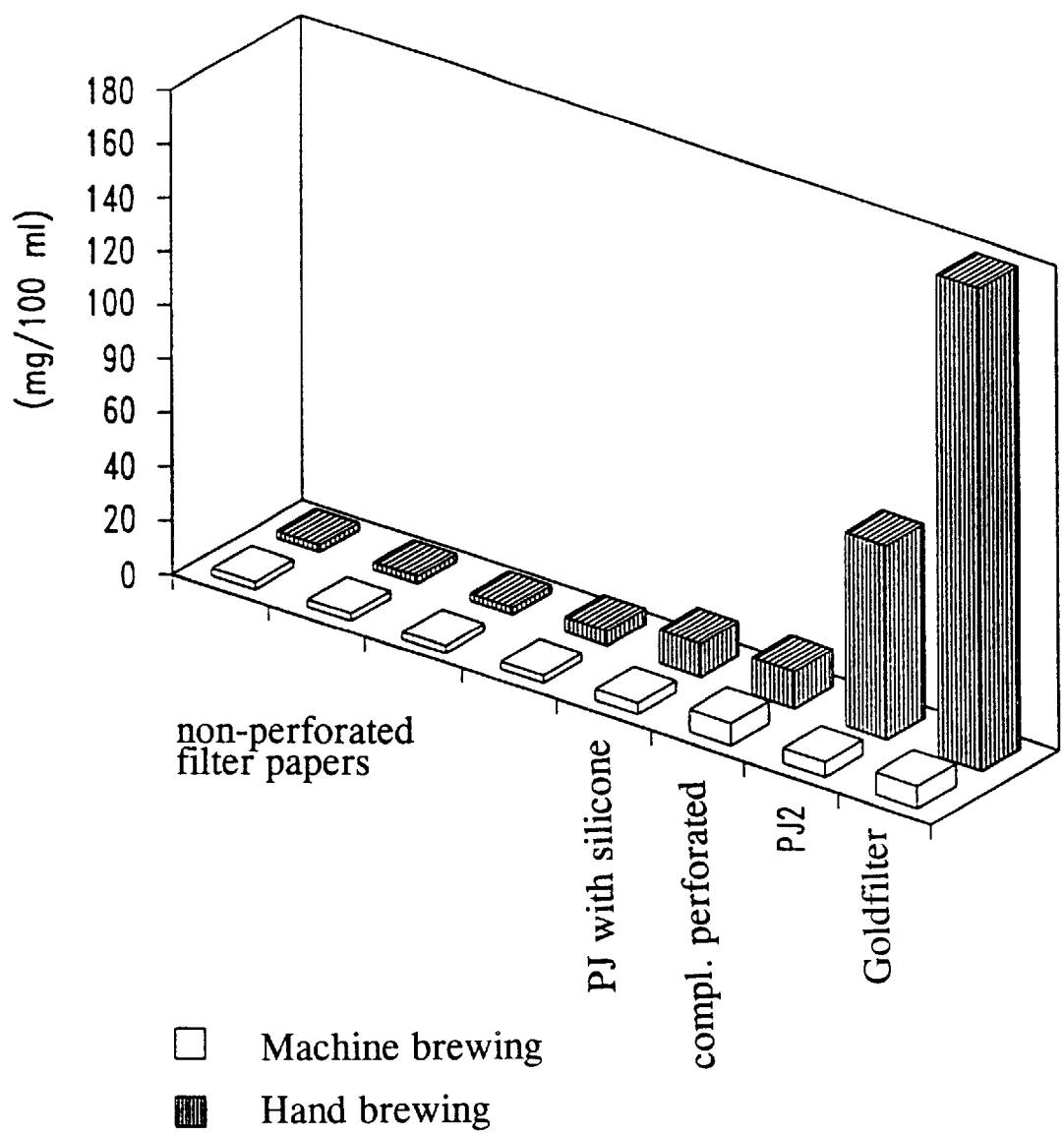
FIG. 13 shows a further statistical diagram showing the amount of coffee grounds resulting from filtrates filtered with different filters.

FIG. 13 in particular compares the formation of grounds in machine brewing with that of hand brewing. The first four samples are conventional coffee filter papers. Sample number 5 is a filter according to the present invention whose pores were formed by means of a water jet process, such as the filter "PJ2" in FIG. 12, wherein the upper third of the filter was sealed with silicone. Sample number 6 is a completely perforated filter with a pore width of 0.6 mm. The following filters are those already depicted in conjunction with FIG. 12.

FIG. 13 clearly shows that the advantageous effect of filters according to the present invention described in connection with FIG. 12 is still increased markedly in the case of hand brewing instead of machine brewing.

FIG. 14 shows the flow rate of various samples as a function of the pore surface. The flow rate is a characteristic value of the filter paper determined on the basis of a test specimen with a defined surface and a pre-defined water pressure and water temperature. The pore surface is the product of the pore size (mm$^2$) and the number (per cm$^2$), "r" is the statistical correlation coefficient for the compensating straight line.

In the water jet-treated sample, the flow rate is caused by the thin areas (strongly reduced fiber density) or the porosity of the coffee filter paper and the additionally formed pores. This would correspond to an impermeable filter material with pores having a diameter of about 0.5 mm. Therefore, such a filter is preferred for applications requiring a high flow rate in combination with good filtration properties, e.g. for preventing the filter from overflowing during the automatic brewing of coffee in a coffee machine.

What is claimed is:

1. A filter for brewed beverages, comprising:
   a filter comprised of fibrous material and having pores defined therein which have an average pore width (d) of at least about 0.1 mm when measured at a fiber density of about 50% of the original or average fiber density of the material.

2. The filter of claim 1, wherein the pores have an average pore width (d) ranging from about 0.1 mm to about 0.7 mm when measured at a fiber density of about 50% of the original or average fiber density of the material.

3. The filter of claim 2, wherein the pores have an average pore width (d) ranging from about 0.1 mm to about 0.6 mm when measured at a fiber density of about 50% of the original or average fiber density of the material.

4. The filter of claim 1, wherein the pores have an average pore width (d) of about 0.1 mm to about 0.4 mm, preferably to about 0.3 mm, measured at a fiber density of about 50% of the original or average fiber density of the material.

5. The filter of claim 4, wherein the pores have an average pore width (d) of about 0.1 mm to about 0.3 mm, measured at a fiber density of about 50% of the original or average fiber density of the material.

6. The filter of claim 1, wherein, at a pore width ($d_{90}$) which corresponds to 90% of the average pore width (d), the fiber density ranges from about 0% to about 40% of the original or average fiber density of the material.

7. The filter of claim 1, wherein, at a pore width ($d_{90}$) which corresponds to 90% of the average pore width (d), the fiber density ranges from about 0% to about 20% of the original or average fiber density of the material.

8. The filter of claim 1, wherein, at a pore width ($d_{90}$) which corresponds to 90% of the average pore width (d), the fiber density ranges from about 5% to about 15% of the original or average fiber density of the material.

9. The filter of claim 1, wherein, at a pore width ($d_{90}$) which corresponds to 90% of the average pore width (d), the fiber density ranges from about 10% of the original or average fiber density of the material.

10. The filter of claim 1, wherein the filter has an entire filter surface, and wherein the filter has a free pore surface which amounts to up to about 20% of the entire filter surface.

11. The filter of claim 1, wherein the filter is comprised of paper.

12. The filter of claim 1, wherein the pores are needle-made pores produced by piercing the fibrous material with needles.

13. The filter of claim 1, wherein the pores are water jet-made pores produced by piercing the fibrous material with water jets.

14. The filter of claim 1, wherein the filter has top and bottom portions, and wherein at least one of (A) the average pore width (d) and (B) surface density of the pores increases from the top portion towards the bottom portion.

15. The filter of claim 1, wherein at least some of the pores are formed and located in such a way as to form a perforation, and wherein that the filter has a size which may be reduced by tearing along the perforation so that the filter may be inserted into a filter holder having a reduced size in use.

16. The filter of claim 1, wherein at least some of the pores are formed and located in such a way as to form folding lines which support opening the filter when inserted into a filter holder in use.

17. A process for producing a filter for brewed beverages comprised of a filter comprising fibrous material and having pores defined therein which have an average pore width (d) of at least about 0.1 mm when measured at a fiber density of about 50% of the original or average fiber density of the material, the process comprising the steps of:
   providing a fibrous material; and
   forming pores in the fibrous material having an average pore width (d) of at least about 0.1 mm measured at a fiber density of about 50% of the original or average fiber density of the material.

18. The process of claim 17, wherein forming the pores is accomplished by piercing the fibrous material with needles.

19. The process of claim 17, wherein forming the pores is accomplished by piercing the fibrous material by rolling a needle roller having needles provided thereon over the fibrous material.

20. The process of claim 17, wherein forming the pores is accomplished by piercing the fibrous material with water jets.

* * * * *